United States Patent [19]

Morris et al.

[11] Patent Number: 4,641,217

[45] Date of Patent: Feb. 3, 1987

[54] TWO POLE GROUND FAULT CIRCUIT BREAKER

[75] Inventors: Robert A. Morris, Burlington; Paul T. Rajotte; Ronald R. Russell, both of Plainville; George W. Kiesel, Burlington, all of Conn.

[73] Assignee: General Electric Company, New York, N.Y.

[21] Appl. No.: 739,810

[22] Filed: May 31, 1985

[51] Int. Cl.⁴ .................. H02H 3/28; H01H 73/06
[52] U.S. Cl. ...................... 361/45; 335/18; 335/132; 361/47; 361/115
[58] Field of Search ................... 361/42–49, 361/115; 335/18, 132

[56] References Cited

U.S. PATENT DOCUMENTS

| | | | |
|---|---|---|---|
| 3,288,965 | 11/1966 | Klein | 200/116 |
| 3,636,482 | 1/1972 | Edmunds | 361/115 |
| 3,855,502 | 12/1974 | Pardue et al. | 335/18 |
| 3,908,154 | 9/1975 | Gryctko | 361/45 |
| 3,970,975 | 7/1976 | Gryctko | 335/18 |
| 3,999,103 | 12/1976 | Misencik et al. | 361/45 |
| 4,156,884 | 5/1979 | Eckart et al. | 361/50 X |
| 4,340,920 | 7/1982 | Gill et al. | 361/49 |

Primary Examiner—A. D. Pellinen
Assistant Examiner—Jeffrey A. Gaffin
Attorney, Agent, or Firm—Richard A. Menelly; Walter C. Bernkopf; Fred Jacob

[57] ABSTRACT

A two pole ground fault circuit breaker is provided by the attachment of a power supply module and a second single pole circuit breaker module to a completely assembled single pole ground fault circuit breaker. Electrical interconnection between the signal processor circuit within the single pole ground fault circuit breaker module and the second pole is made by a first pair of conductors. Interconnection between the power supply module and the single pole within the ground fault circuit breaker is provided by a separate pair of conductors.

6 Claims, 6 Drawing Figures

TWO POLE GROUND FAULT CIRCUIT BREAKER

BACKGROUND OF THE INVENTION

U.S. patent application Ser. No. 725,730 filed Apr. 22, 1985, in names of Robert A. Morris et al. describes a single pole ground fault circuit breaker that is assembled in part by an automated process. The commercial success of this single pole ground fault circuit breaker arrangement has prompted the requirement of a two pole ground fault circuit interrupter at a similar reduction in cost. The instant invention provides means for adapting the Morris et al. single pole ground fault circuit breaker to a two pole breaker with both poles sharing the same ground fault module and signal processor circuit.

SUMMARY OF THE INVENTION

A two pole ground fault circuit breaker is provided by interfacing a power supply module between a first single pole breaker module and a second single pole ground fault circuit breaker module. Electrical interconnection between the ground fault signal processor circuit and the first and second poles is made by means of a first pair of conductors and electrical connection between the power supply module and the first single pole circuit breaker is made by means of a separate pair of conductors.

DESCRIPTION OF THE PREFERRED EMBODIMENT

Figure 1:
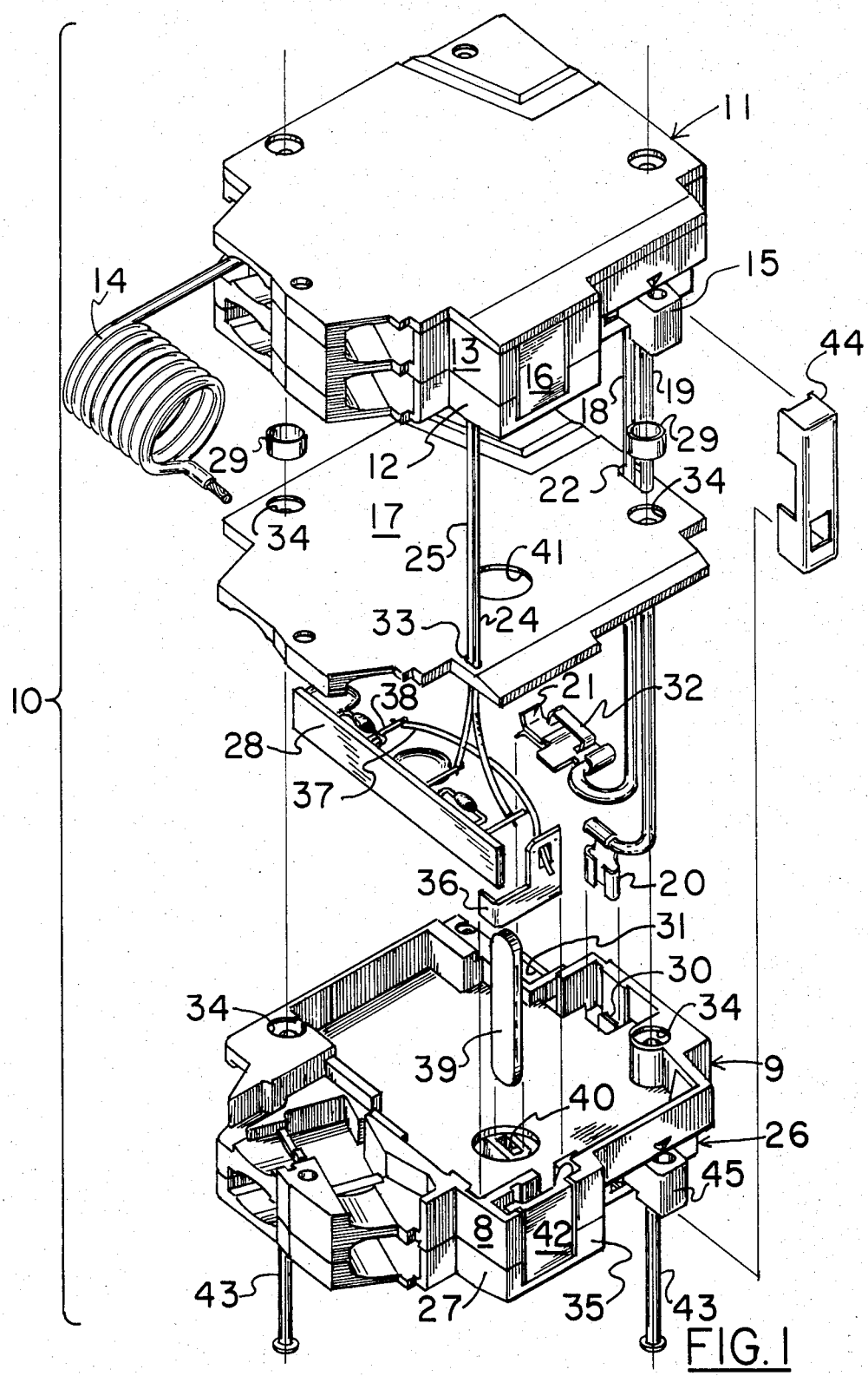
FIG. 1 is a top perspective view in isometric projection of a two pole ground fault circuit breaker according to the invention.

FIG. 1 shows the two-pole ground fault circuit breaker 10 with the single pole ground fault circuit breaker 11 (hereafter "first pole") pre-assembled as described in the aforementioned U.S. patent application and having the single pole circuit breaker module 12 (hereafter "first pole module") attached to the ground fault module 13. The wire turns 14 provide electrical access with the line neutral terminal of the ground fault module. The on-off handle 15 is shown projecting from the first pole module 12 and the test button 16 extends between both the ground fault module and the circuit breaker module. The first pole module 12 is arranged to be connected with the second pole contained within a similar single pole circuit breaker module 26 (hereafter "second pole module"). The cover 17 of the second pole module 26 is first connected with the bottom of the first pole module 12 before connecting with the power supply module 9 and the second pole circuit breaker module 26 which houses the second pole circuit breaker (hereafter "second pole"). The line side insulated conductor 18 for the second pole and the load side insulated conductor 19 for the second pole are fed through a slot 22 provided within the cover. The load side conductor terminates in a flag-type spade connector 20 which connects with the terminal end 30 of the second pole. Conductor 18 terminates in the line stab connector 21 for the second pole which nests within the recess 31 and upon which the stab spring 32 is later positioned. A power supply printed wire board 28 located within the power supply module 9 electrically interconnects with the signal processor module contained within the ground fault module 13 by means of power supply insulated conductors 24, 25. The conductors extend through an opening 33 in the cover 17 and a pair of locating spacers 29 are arranged within the counter-bored rivet openings 34 before attaching the cover 17 to the first pole module 12. An electrically conductive retainer 36 similar to that described within the aforementioned patent application, electrically connects by means of conductor 37 with a pin 38 on the power supply printed wire board 28, and is inserted within the power supply module 9 by placing within a recess formed within the molded extension 35 formed within both the second pole case 27 and the power supply module case 8. Arranged within the second pole module 26 is a trip cam 40 which cooperates with a similar trip cam located within the first pole module 12 for interconnecting the trip mechanisms in both poles by means of a common trip bar 39. A good description of the means for mounting a common trip bar within multiple pole molded case circuit breakers is found within U.S. Pat. No. 3,288,965 to K. W. Klein, which patent is incorporated herein for purposes of reference. The trip bar extends through the knockout opening 41 formed within the cover 17. A plastic insert 42 within the molded extension 35 closes off the extension in lieu of a test button 16 which is not required. Once the power supply module 9, the second pole module 26 and the single pole ground fault breaker 11 are electrically interconnected, they are fastened together by means of rivets 43 extending through the rivet openings 34, and the handle tie 44 is plugged over the first pole on-off handle 15 and the second pole on-off handle 45, as is common with all two-pole circuit breaker assemblies.

Figure 3:
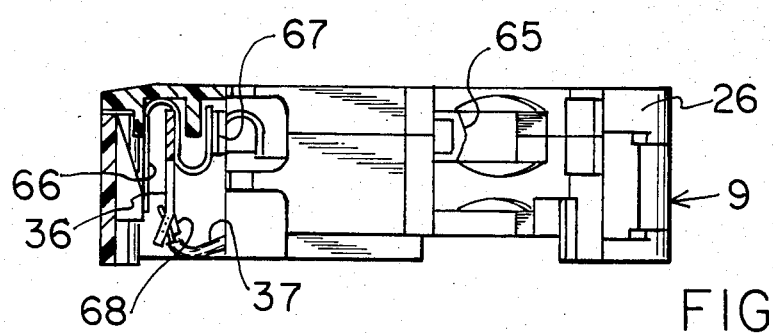
FIG. 3 is a front view of the power supply module connected with the second pole breaker module.
Figure 2:
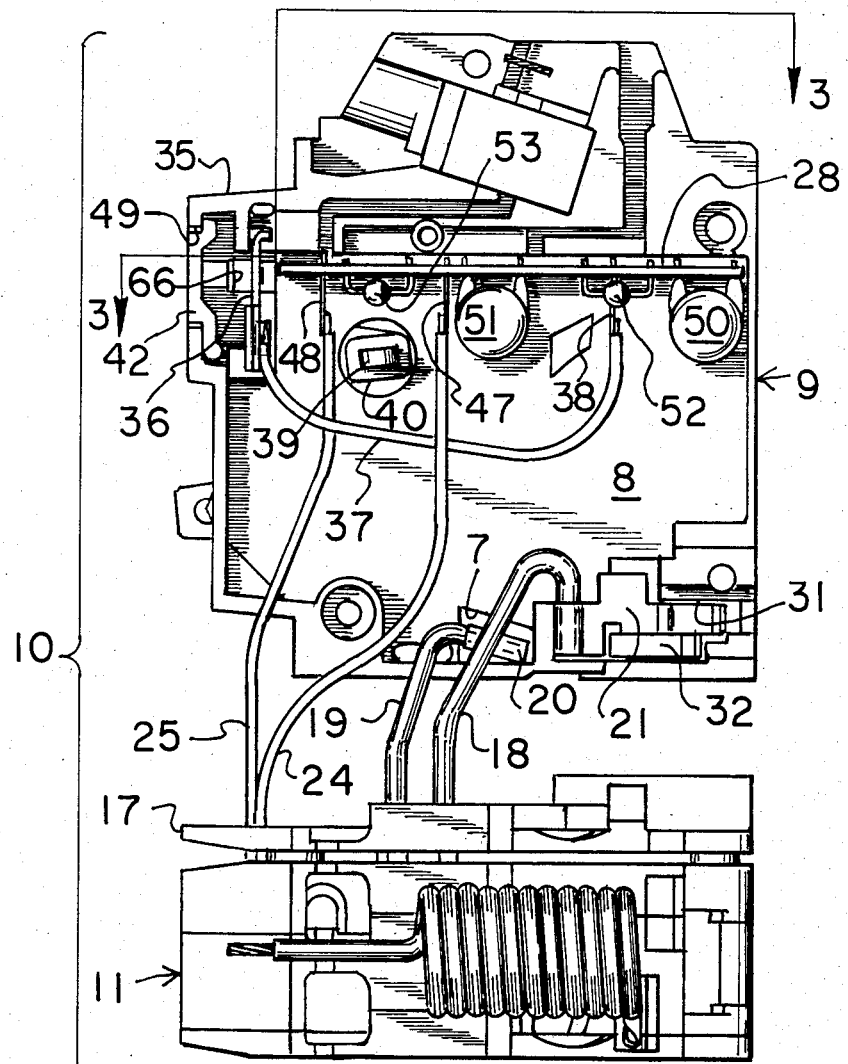
FIG. 2 is a front view of the ground fault circuit breaker of FIG. 1 with the power supply electrically connected and depicted in plan view to show the wiring interconnections between the power supply and the first pole breaker.
Figure 5:
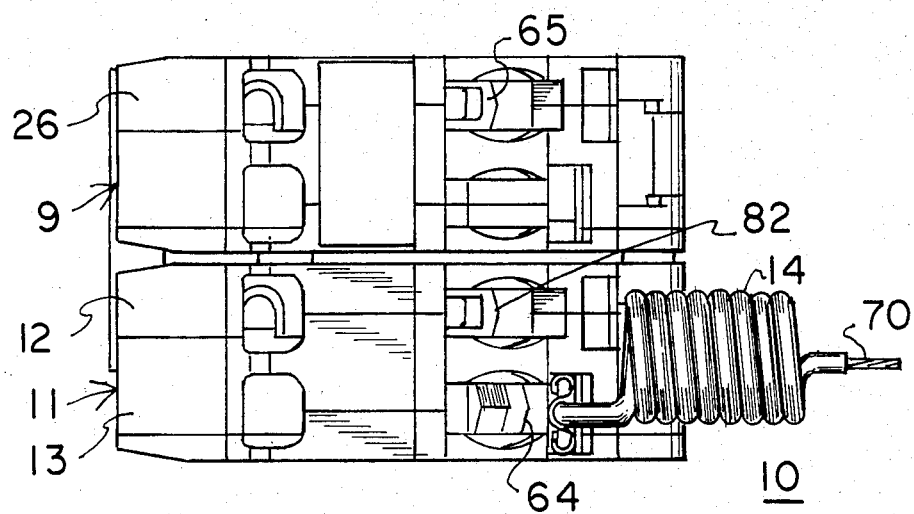
FIG. 5 is a front view of the completely assembled two pole ground fault circuit breaker of FIG. 1.

The two-pole ground fault circuit breaker 10 is shown in FIG. 2 with the cover 17 attached to the single pole ground fault breaker 11 and with the conductors 18, 19 and 24, 25 attached to the power supply module 9. The flag-type spade connector at the end of conductor 19 is plugged through an opening 7 in the power supply case 8 onto the terminal end (not shown) of the second pole breaker. The line stab connector 21 sits inside the recess 31 formed within the power supply module case 8. The conductor 37 is connected between a pin 38 on the power supply printed wire board 28 and the retainer 36 shown supported within the molded extension 35. As described earlier, the plastic insert 42 is used in place of the trip button to block off the opening in the slot 49 formed within the power supply module case 8. The connection between conductor 24 and the power supply printed wire board 28 is shown at pin 47 and the connection between the power supply printed wire board and conductor 25 is shown at pin 48. The various power supply components such as varistors 50, 51 and diodes 52, 53 are shown extending from the top of the power supply printed wire board 28. The retainer 36 is held within the molded extension 35 by means of a test spring 66 as fully described in the aforementioned U.S. patent application. As seen by referring now to FIG. 3, conductor 37 electrically connects with the line terminal of the second pole breaker through the junction 67 between the second pole bi-metal and line strap (not shown) through the retainer 36 and the test spring 66. The end of the conductor 37 is electrically connected with the retainer 36 by means of the lanced aperture 68 formed within the retainer as indicated. External electrical connection with the line side of the second pole module 26 is made by means of the second pole line-load lug 65. The completely assembled two-pole ground fault circuit breaker 10 is depicted in FIG. 5 with the single pole ground fault circuit breaker 11, consisting of the first pole module 12 operatively connected with the ground fault module 13, electrically and mechanically connected with the power supply module 9 and the second pole module 26. External electrical connection is made with the two-pole ground fault circuit breaker 10 by means of the load neutral lug 64 and by means of the second pole line-load lug 65, by means of a first pole line-load lug 82, and by means of the line-neutral conductor 70.

Figure 4:
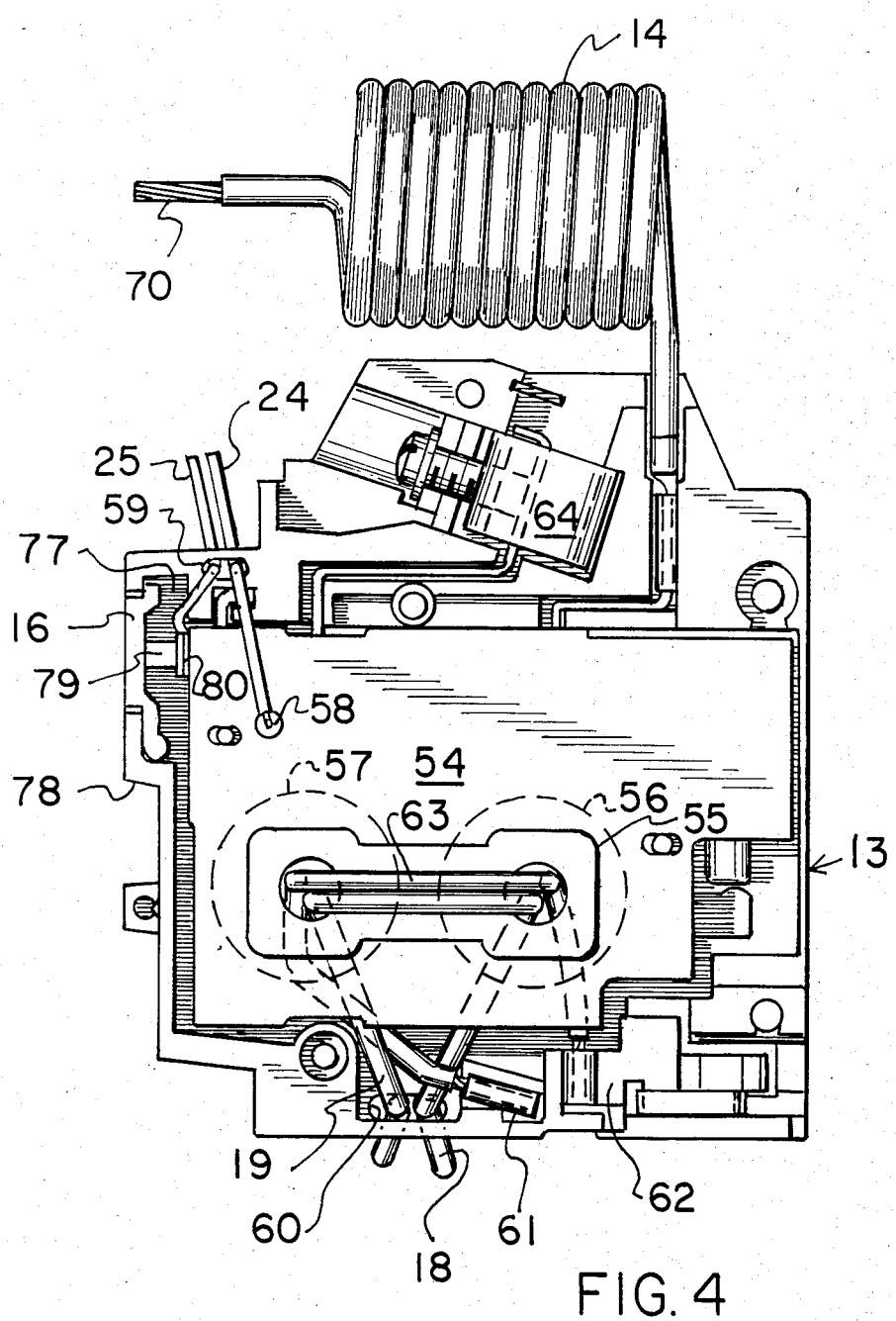
FIG. 4 is a plan view of the gound fault module within the two pole ground fault circuit breaker of FIG. 1.

To show the arrangement of the conductors 18, 19 within the signal processor module 13, the bottom of the signal processor module is shown in FIG. 4. Both of the conductors pass through a slot 60 formed in the ground fault module case and pass under the signal processor printed wire board 54 to which the differential current transformer 57 and the neutral excitation transformer 56 are mounted and interconnected by means of connector strap 55. The insulated wire conductor 63 for the first pole connects from the first pole flag-type connector 61 through the apertures of both transformers back out to the first pole stab connector 62. Conductor 18 passes first through the aperture of the neutral excitation transformer 56 then through the aperture of the differential current transformer from which it exits as conductor 19 for connection with the second pole. One of the power supply conductors 24 connects with the signal processor printed wire board by means of conductor pad 58 and extends out from the ground fault module through a slot 59 formed in the ground fault module case. The other power supply conductor 25 passes through the slot 59 and electrically connects with a retainer, which is not shown, but which is similar to that depicted at 36 in FIG. 3 and which was described within the referenced patent application as electrically connected with the junction between the bi-metal and line strap within the first pole breaker module 12, which is attached below the ground fault module 13 as earlier described. The test button 16 is arranged within a recess 77 formed within the molded extension 78 for temporary electrical contact in between the test spring 80 and the ground fault module 13. External electrical connection with the first pole is made by means of the load-neutral lug 64 and by means of line neutral conductor 70 at the end of the wire turns 14.

Figure 6:
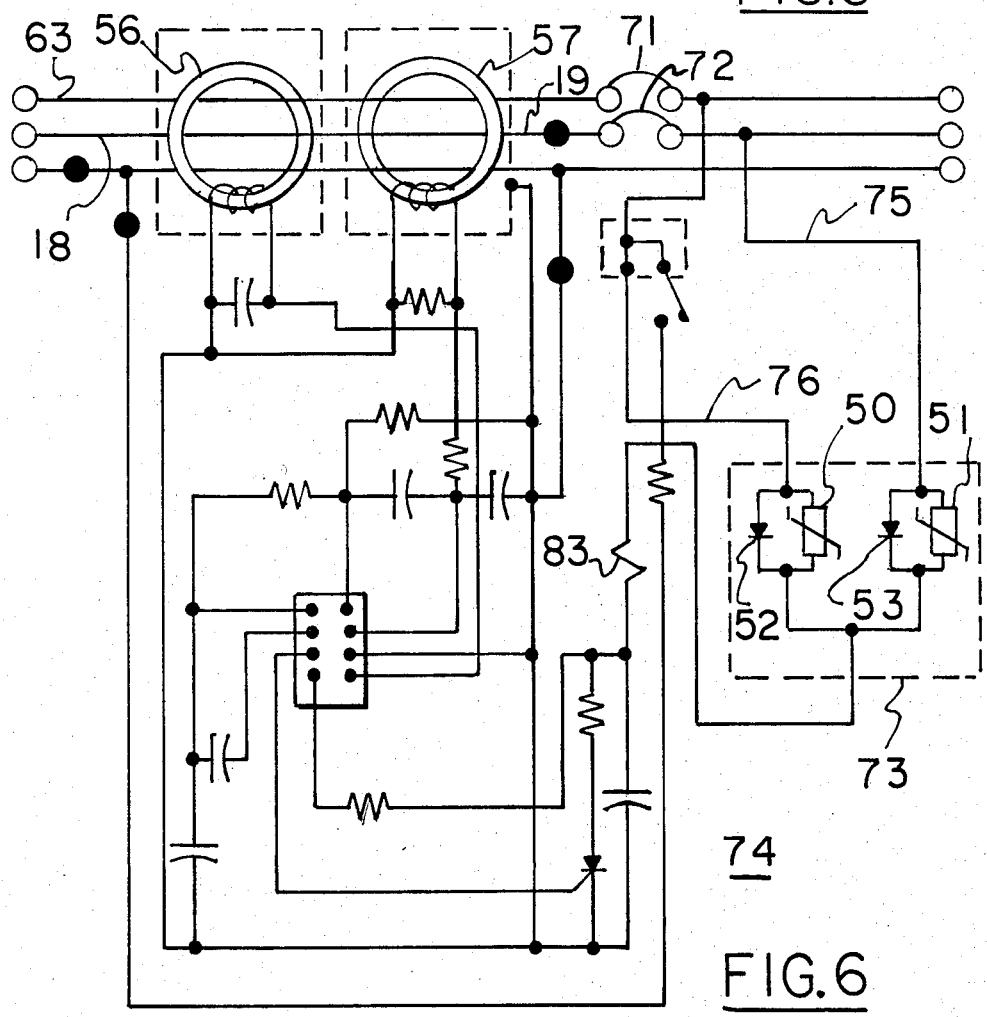
FIG. 6 is a schematic representation of the signal processor circuit and power supply circuit within the two pole ground fault circuit breaker according to the invention.

The signal processor circuit 74 shown in FIG. 6 is similar to that described within the aformentioned U.S. patent application with the inclusion of the first pole breaker contacts 71 in series within the insulated wire conductor 63 which passes through the apertures of the neutral excitation transformer 56 and the differential current transformer 57. The second pole conductor 18 on one side of the neutral and differential current transformers becomes conductor 19 on the other side of both transformers as described earlier with reference to FIG. 4. The second pole breaker contacts 72 are in series with conductor 19 as indicated. The power supply circuit 73 consisting of the parallel arrangement of varistor 50, diode 52 and varistor 51, diode 53 is connected between the first and second pole conductors by means of conductor 75 and 76.

With reference to the drawings, it has thus been shown that a two pole ground fault circuit breaker 10 can be provided by the addition of a second pole module 26 interfaced between a single pole ground fault circuit breaker 11 by means of a power supply module 9. The power supply module feeds electric power to the ground fault module 13 by means of the power supply circuit 73, which receives input power from either the first or the second pole. The two pole ground fault circuit breaker 10 will therefore remain functional to maintain ground fault protection to the remaining pole if either pole should lose electrical power.

The trip solenoid 83 is electrically connected in series with power supply circuit 73. The diodes 52, 53 are required within conductors 75, 76 to provide DC rectification to the signal processor circuit 74. It has been customary to locate a separate solenoid within each pole of a two pole ground fault circuit breaker. It has since been discovered that by using a pair of avalanche diodes and employing a varistor across each diode, such as within power supply circuit 73 that a single signal processor circuit 74 can be employed for both poles. This therefore allows a single signal processor circuit 74 within a ground fault module 13 which includes a single solenoid to be used for both one pole and two pole breakers by the simple addition of the power supply circuit 73 rather than an entire signal processor circuit. The signal processor circuit within the ground fault module 13 is fabricated on highly automated equipment and it would require a substantial adaptation of the standard one pole signal processor circuit to otherwise provide two pole ground fault protections.

Having described our invention, what we claim as new and desire to secure by Letters Patent is:

1. A two pole ground fault circuit breaker comprising:
   a first pole circuit breaker with a first molded case and operatively connected with a ground fault circuit module within a second molded case;
   a second pole circuit breaker within a third molded case operatively connected with both said ground fault module and said first pole circuit breaker; and
   a power supply circuit within a fourth molded case electrically connected with both said first and second pole circuit breakers and said ground fault module for supplying operating power to said ground module from either of said first or second pole circuit breakers;
   said power supply circuit comprising the parallel combination of a first diode and varistor connecting between said first pole circuit breaker and said ground fault circuit interrupter for providing first DC operating power to said ground fault module and the parallel combination of a second diode and varistor connecting between said second pole circuit breaker and said ground fault module for providing second DC operating power to said ground fault module, said power supply and said ground fault module being electrically interconnected by means of a second pair of insulated wire conductors, first ends of said first and second conductors being electrically connected to pins on a printed wire board supporting said power supply circuit, said power supply case comprising means for retaining said printed wire board such that a bottom edge of said printed wire board is perpendicular to a bottom surface of said power supply case and said first diode and varistor are mounted on said printed wire board parallel to said bottom surface.

2. The two pole ground fault circuit breaker of claim 1 wherein said first and second pole circuit breakers are interconnected by means of a common trip bar extending through said power supply molded case.

3. The two pole ground fault circuit breaker of claim 1 wherein said ground fault module includes a single solenoid for tripping both said first and second pole circuit breakers.

4. The two pole ground fault circuit breaker of claim 1 wherein said first and second pole circuit breakers are electrically interconnected by a first pair of insulated wire conductors terminating in spade-type connectors.

5. The two pole ground fault circuit breaker of claim 1 wherein said first diode is electrically connected with said first pole circuit breaker by electrical connection with a first retainer clip, said first retainer clip being electrically connected with a first load terminal strap within said first pole circuit breaker.

6. The two pole ground fault circuit breaker of claim 5 wherein said power supply case includes an integrally formed extension adjacent said printed wire board for supporting a second retainer clip, said second diode being electrically connected with said second pole circuit breaker by electrical connection with said second retainer clip, said second retainer clip being electrically with a second load terminal strap within said second pole circuit breaker.

* * * * *